United States Patent [19]

Meyer et al.

[11] Patent Number: 4,837,297
[45] Date of Patent: Jun. 6, 1989

[54] PROCESS FOR THE HYDROLYTIC PREPARATION OF A PREPOLYMER AMIDE FROM A $C_{12}$-AMINOCARBOXYLIC ACID LACTAM

[75] Inventors: Klaus-Rudolf Meyer, Hattingen; Ingo Venn, Recklinghausen; Ursula Mueller-Niescher, Marl, all of Fed. Rep. of Germany

[73] Assignee: Huels Aktiengesellschaft, Marl, Fed. Rep. of Germany

[21] Appl. No.: 58,871

[22] Filed: Jun. 5, 1987

[30] Foreign Application Priority Data

Jun. 28, 1986 [DE] Fed. Rep. of Germany ....... 3621804

[51] Int. Cl.$^4$ .............................................. C08G 69/14
[52] U.S. Cl. ..................................... 528/326; 528/323
[58] Field of Search ................................ 528/326, 323

[56] References Cited

U.S. PATENT DOCUMENTS 4,077,946  3/1978  Enenshtein et al. ................ 528/326
4,273,919  6/1981  Feldmann et al. .................. 528/326

*Primary Examiner*—Harold D. Anderson
*Attorney, Agent, or Firm*—Oblon, Fisher, Spivak, McClelland & Maier

[57] ABSTRACT

A process for the preparation of a prepolymer amide, by hydrolytically polymerizing a lactam/water mixture of a $C_{12}$-aminocarboxylic acid lactam at a temperature in the range from 240–360° C. and a steam pressure in the range of 30–180 bar, and wherein the water content of the lactam/water mixture is in the range of 7.5–30% by weight.

9 Claims, No Drawings

PROCESS FOR THE HYDROLYTIC PREPARATION OF A PREPOLYMER AMIDE FROM A $C_{12}$-AMINOCARBOXYLIC ACID LACTAM

BACKGROUND OF THE INVENTION

1. Field of the Invention

The invention relates to a process for the preparation of a prepolymer amide, having a degree of polymerization within the range from 5 to 20 (number average) from a $C_{12}$-aminocarboxylic acid lactam by hydrolytic polymerization at an elevated temperature and elevated pressure.

2. Discussion of the Background

The preparation of prepolymer amides from aminocarboxylic acid lactams at an elevated temperature and under elevated pressure is known in principle.

Thus, Japanese Published Specification No. 59/164,327 describes a method of preparation of polycondensates from lactams having 7 to 12 members within the ring in a temperature range from 220° to 280° C. and under pressure ranging up to 10 bar. This choice of parameters leads to unsatisfactory results with respect to the space/time yield with $C_{12}$-aminocarboxylic acid polycondensates.

Further, a process is known from Japanese Published Specification 60/41,647 in which temperatures in the range from 295° to 370° C. and a water content from 2 to 50 percent by weight are used.

SUMMARY OF THE INVENTION

Accordingly, the object of the present invention is to provide a method for the preparation of a prepolymer amide from a $C_{12}$-aminocarboxylic acid lactam in which the temperature and water content of the reaction mixture are related to one another in such a way that the prepolymer can be produced economically.

This object and other objects which will become apparent from the specification have been achieved by the process of the present invention which comprises hydrolytically polymerizing a lactam/water mixture of a $C_{12}$-aminocarboxylic acid lactam at a temperature of about 240°–360° C. and a steam pressure of about 30–180 bar, and in which the water content of the lactam/water mixture is in the range of about 7.5–30% by weight, to produce a prepolymer amide having a number average degree of polymerization of 5–20.

DETAILED DESCRIPTION OF THE PREFERRED EMBODIMENTS

The chemical process for preparing a prepolymer amide from aminocarboxylic acid lactams is known in all chemical and technical detail (see Ullmanns Enzyklopadie d. techn. Chemie (Ullmann's Encyclopedia of Industrial Chemistry), 4th edition, volume 19, Chapter 2.2 and Chaper 3).

According to the invention, a steam pressure in the range from 30 to 180 bar, preferably 60 to 150 bar, a temperature in the range from 240° to 360° C., preferably 280° to 355° C., and a water content of the lactam/water mixture in the range from 7.5 to 30 percent by weight, preferably 10 to 25 percent by weight, are used. In a more preferred process, a steam pressure in the range from 45 to 100 bar, a temperature from 260° C. to an upper limit the boundary line of which is linear in a plot of temperature vs. water content, and is characterized by the following parameters:

340° C.—3.0 percent by weight of water,
325° C.—10.0 percent by weight of water,
310° C.—20.0 percent by weight of water,
300° C.—30.0 percent by weight of water, and a water content in the range from 7.5 to 30 percent by weight are chosen.

The starting monomer may be pure $C_{12}$-aminocarboxylic acid lactam or up to 6.5 percent by weight of this monomer can be replaced by caprolactam and/or hexamethylenediamine and dodecanedicarboxylic acid.

Using the process according to the invention it now becomes possible to achieve an economic space/time yield within the predetermined pressure range.

Surprisingly, it has been found that in spite of the pressure increasing with increasing water content the reaction times cannot be reduced below a certain limiting value and the latter is achieved at a comparatively modest water content (see Table I).

The process according to the invention unexpectedly permits a marked improvement in the space/time yield. Thus, in the prior art, a reaction time of about 6 to 8 hours is required for almost quantitative conversion. In the process according to the invention the time can be lowered to between 10 minutes and 3.5 hours depending on the balancing of the parameters.

Other features of the invention will become apparent during the course of the following descriptions of exemplary embodiments which are given for illustration of the invention and are not intended to be limiting thereof.

EXAMPLES

Experiments 1 to 6 and A to C (corresponding to Japanese Published Specification 60/41,647) were carried out in a high-pressure autoclave with a 1000 ml nominal volume, equipped with a stirrer, electric heater, temperature and pressure measuring device, and for nitrogen and vacuum connection and addition and sampling devices. After the aluryl-lactam pellets had been introduced, the reactor was flushed with very pure nitrogen, evacuated (5 mbar) and heated, and the hydrolytic polymerization was then started by rapid addition of water which had been distilled under $N_2$ and was thermostatically kept at the reaction temperature.

The samples taken under pressure at the reaction temperature were rapidly cooled to room temperature. The water content was determined gravimetrically from the weight loss on drying (50° C., 100 mbar). The number-average degree of polymerization ($\bar{p}_n$) was determined by end group analysis (potentiometric) titration of the material dissolved in m-cresol or by indicator titration of the material dissolved in boiling benzyl alcohol). The lauryl-lactam content was determined by gas chromatography.

The space/time yield was calculated assuming that the partial volumes of water and lauryl-lactam were additive at the reaction temperature.

The experimental parameters and results are shown in Table I.

TABLE I

| Experiment No. | Charge Lauryl-lactam (g) | Water (g) | Reaction temperature (°C.) | Maximum pressure (bar) | Reaction time (min) | Water content of sample (% by) (weight) | Residual Lauryl-lactam content of the dried sample (% by weight) | $\overline{p_n}$ | Space-time yield $\frac{(10^3 \text{ tons})}{(m^3 \cdot \text{year})}$ |
|---|---|---|---|---|---|---|---|---|---|
| A | 728.5 | 38.5 | 355 | 59 | 22 | 2.9 | 0.55 | 18.3 | 18 |
| 1 | 676.0 | 75.5 | 355 | 1.3 | 15.5 | 7.5 | 0.60 | 12.1 | 24 |
| 2 | 577.5 | 144.5 | 355 | 144 | 12 | 15.5 | 0.43 | 8.5 | 27 |
| 3 | 486.5 | 208.5 | 355 | 167 | 12 | 24.9 | 0.53 | 7.4 | 23 |
| B | 402.0 | 268.0 | 355 | 170 | 13.5 | 35.0 | 0.67 | 6.2 | 17 |
| 4 | 618.0 | 154.5 | 318 | 102 | 40 | 16.9 | 0.48 | 9.8 | 8.5 |
| C | 447.0 | 298.0 | 318 | 109 | 45 | 37.2 | 0.60 | 7.5 | 5.5 |
| 5 | 736.0 | 82.0 | 278 | 51 | 298 | 8.5 | 0.50 | 17.2 | 1.32 |
| 6 | 648.0 | 162.0 | 278 | 62 | 211 | 18.5 | 0.52 | 12.3 | 1.65 |

In experiments D to I the procedure followed was in accordance with Japanese Published Specification 60/41,641, in that, using two reciprocating diaphragm metering pumps, water and liquid lauryl-lactam, after having been heated to the reaction temperature, were combined at the top of an electrically heated reaction tube of 10.2 liters volume, equipped with static mixer elements. After having passed through the reaction tube, the melt was cooled to 210° C. and discharged via a pressure-retaining valve (130 bar) into a vessel kept at a constant pressure of 20 bar. A sampling device permitted melt under pressure to be withdrawn between the exit of the reaction tube and the cooling zone. The samples were cooled rapidly to room temperature and were analyzed, as described above, to determine the contents of water and residual lauryl-lactam, and the number-average degree of polymerization.

The residence time was calculated from the volume of the tubular reactor and the stream passing through, assuming that the partial volumes of water and lauryl-lactam were additive at the reaction temperature.

The experimental parameters and results are shown in Table II.

TABLE II

| Experiment No. | Charge Lauryl-lactam (kg/h) | Water (kg/h) | Reaction temperature (°C.) | Residence time (min) | Water content of sample (% by) (weight) | Residual Lauryl-lactam content of the dried sample (% by weight) | $\overline{p_n}$ | Space-time yield $\frac{(10^3 \text{ tons})}{(m^3 \cdot \text{year})}$ |
|---|---|---|---|---|---|---|---|---|
| A | 7.892 | 0.733Z | 318 | 56 | 8.0 | 1.0 | 14.0 | 6.8 |
| E | 9.788 | 2.076 | 318 | 40 | 16.8 | 0.8 | 9.6 | 8.5 |
| F | 6.294 | 3.858 | 318 | 45 | 37.3 | 0.9 | 7.4 | 5.5 |
| G | 11.055 | 1.027 | 318 | 40 | 8.2 | 5.1 | — | — |
| H | 9.788 | 2.076 | 318 | 40 | 16.8 | 0.8 | — | — |
| I | 7.091 | 4.346 | 318 | 40 | 37.5 | 1.6 | — | — |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A process for the preparation of a prepolymer amide, comprising the steps of:

(1) hydrolytically polymerizing a lactam/water mixture of lauryl lactam at a steam pressure in the range of 45 to 100 bar, and at a temperature which is in the range from 260° C. to an upper limit which is defined by a boundary line defined by the following parameters:
   340° C.—3.0 percent by weight of water,
   325° C.—10.0 percent by weight of water,
   310° C.—20.0 percent by weight of water,
   300° C.—30.0 percent by weight of water; and
   (ii) obtaining a prepolymer amide having a number average degree of polymerization of from 5 to 20.

2. The process of claim 1, wherein said temperature is in the range of from 280° to 340° C.

3. The process of claim 1, wherein said steam pressure is in the range of from 60 to 100 bar.

4. The process of claim 1, wherein said water content of said lactam/water mixture is in the range of from 10 to 25% by weight.

5. The process of claim 1, wherein said water content is in the range from 12 to 20% by weight.

6. The process of claim 1, wherein up to 6.5% by weight of said lauryl acid lactam is replaced by caprolactam.

7. The process of claim 1, wherein up to 6.5% by weight of said lauryl lactam is replaced by hexamethylenediamine and dodecanedicarboxylic acid.

8. The process of claim 1, wherein up to 6.5% by weight of said lauryl lactam is replaced by a mixture of caprolactam, hexamethylenediamine and dodecanedicarboxylic acid.

9. The process of claim 1, wherein said hydrolytic polymerization step is conducted for a time of from 10 minutes to 3.5 hours.

* * * * *